United States Patent Office 3,072,864

Patented Jan. 8, 1963

3,072,864

FREQUENCY MODULATION SYSTEMS

Roger Alexis and Victor Biggi, Paris, France, assignors to Compagnie Generale de Telegraphie Sans Fil, a corporation of France Filed Aug. 4, 1959, Ser. No. 831,649
Claims priority, application France Sept. 4, 1958
5 Claims. (Cl. 332—19)

The present invention relates to frequency modulating arrangements. More particularly it relates to systems for frequency modulating electronically tunable tubes, such as the "Carcinotron" tube, "Carcinotron" being a registered trademark.

As it is known, in electronically tunable tubes, the frequency of the output signal is altered by changing a control voltage. Thus, in a "Carcinotron" tube, the oscillation frequency closely depends on the magnitude of the voltage applied to certain electrodes. Under these conditions, it may be very difficult to control the oscillation frequency in accordance with a predetermined pattern, since any departure of one of the supply voltages from the desired value results in a corresponding alteration of the output frequency.

It is an object of the invention to provide a system which makes it possible to control the oscillation of an electrically tunable tube in strict conformity with a predetermined pattern.

A frequency modulating system according to the invention comprises a modulator, a first feedback loop for controlling the frequency of the electronically tuned tube by the modulator frequency, and two further feedback loops for stabilizing by means of a crystal oscillator the minima and the maxima of the modulator frequency and the recurrence period of the maxima and minima.

Preferably, the modulation follows a triangular waveform pattern and the recurrence period of the maximum and the minimum of the modulating frequency is controlled by means of pulses obtained from an outside source.

The invention will be best understood from the following description and appended drawing, wherein.

Figure 1:
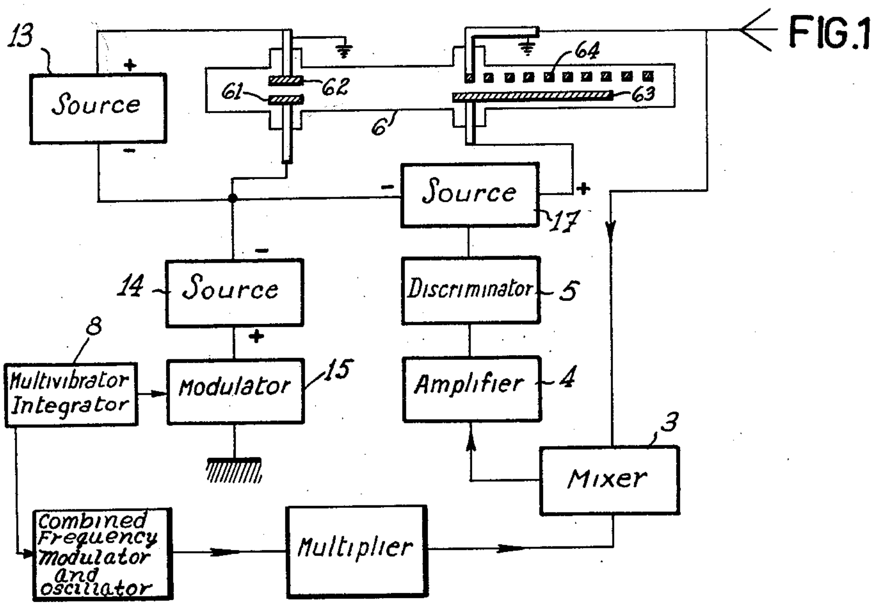
FIG. 1 is an unifilar block diagram of a feedback loop controlling a "Carcinotron" tube.
Figure 3:
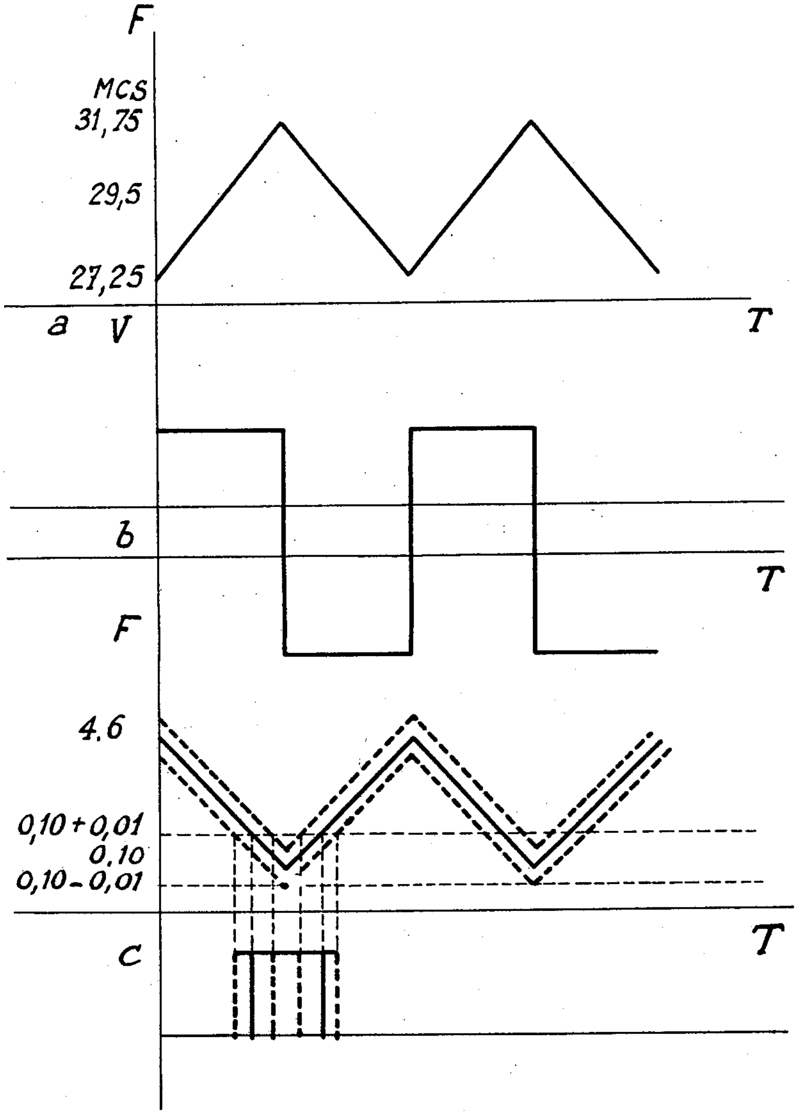
FIG. 3 shows curves explaining the operation of the system of FIGS. 1 and 2.

The system shown in FIG. 1 comprises a multivibrator integrator 8, the operation of which will be explained hereinafter, and delivering a voltage having an isosceles triangle waveform, from a maximum to a minimum and vice-versa, the frequency being 10 c./s. This device feeds, on one side, its output voltage to a combined frequency modulator and oscillator 1 (hereinafter identified simply as a modulator), which delivers a frequency modulated signal whose frequency varies in synchronism with said voltage from 29.5−2.25 mcs. to 29.5+2.25 mcs. This modulation follows an isosceles triangle waveform as shown in FIG. 3*c*, the frequency being also 10 c./s. A multiplier 2 multiplies by eight this output frequency to provide a frequency modulated wave whose frequency varies with the same periodicity between 236+18 mcs. and 236−18 mcs.

The device 8, on the other side, feeds a modulator 15 connected between the ground and the positive pole of the cathode power D.C. supply 14 of a "Carcinotron" 6 and accordingly varies the voltage applied to the cathode 61 of the "Carcinotron" with respect to ground. Another source 17 controlled by a discriminator 5 is series connected between source 14 and the sole electrode 63 of the "Carcinotron" and applies between said sole electrode and delay line 64, which is connected to ground, a voltage variable in accordance with the voltage delivered modulator 15 and discriminator 5. Modulator 15 is actuated by device 8, which determines the operating frequency of the "Carcinotron" 6, for example, this frequency varies between 3340±250 mcs., in synchronism with said voltage. The D.C. power supply 17 is regulated by an error voltage and is intended for adjusting the voltage applied between sole element 63 and delay line 64. A D.C. power supply source 13 has its positive pole connected to anode 62 which is grounded and its negative pole connected to cathode 61.

Multiplier 2 feeds a mixer 3, having another input connected to output of delay line 64. The output frequency of the "Carcinotron" 6 beats with the fourteenth harmonic (i.e. 3304±250 mcs.) of the frequency delivered by multiplier 2. An amplifier 4 amplifies these beats (36 mcs.) and discriminator 5, connected between power source 17 and amplifier 4, and derives from the variations of the frequency of these beats a control voltage which is the error voltage applied to source 17. It is to be pointed out that, if the Carcinotron follows perfectly the modulation law, the beats would be at a fixed frequency (36 mcs.). Discriminator 5 derives from the variation frequency of the beats a control voltage which, controls the output D.C. voltage of source 17, and the effective frequency of the "Carcinotron." This frequency is accordingly effectively controlled by device 8.

The arrangement is completed by the anode supply source 13 and 14.

Figure 2:
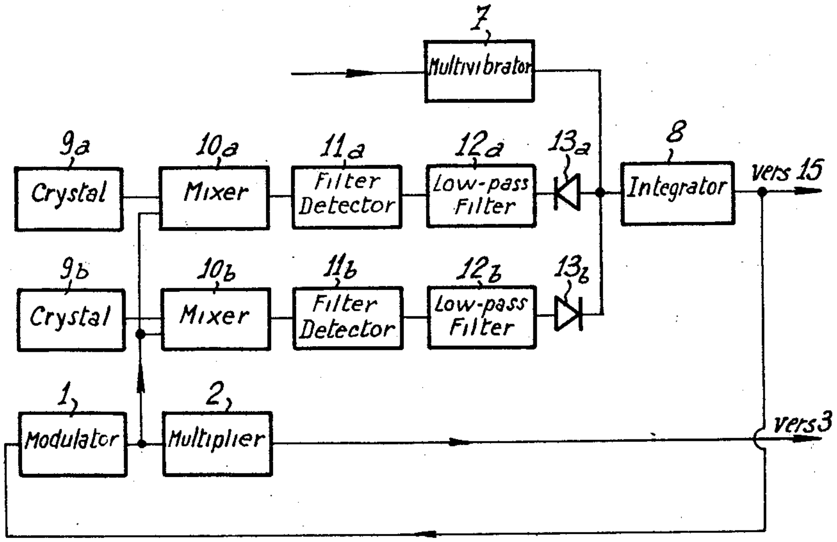
FIG. 2 is a block diagram of the two feedback loops controlling the modulator.

The feedback loops shown in FIG. 2 are arranged for stabilizing the minima of the frequency of modulator 1 and for causing them to occur with a strict periodicity.

To this end, a bi-stable multivibrator 7 is tripped from one state to the other by synchronizing pulses derived from an outside source (not shown). Such signals may, for example, be derived as periodic signals from the carrier signal of a broadcasting station by division of the frequency of this signal. In the present example, the frequency of these pulses is 20 c./s. The multivibrator 7 produces square wave signals, as shown in FIGURE 3*b*. These signals are integrated in integrator 8, to provide the input voltage of modulator 1 and of modulator 15. This latter signal has the same triangular waveform as the output of the modulator 1. A portion of the output of this modulator is collected and after passing through two identical channels is fed back to integrator 8.

The network *a* with reference numbers marked *a* controls the maxima whereas the network *b* with the same reference numbers marked *b* controls the minima of the frequency.

Network *a* comprises a quartz-crystal 9*a* providing a signal of a frequency 31.85 mc./s., i.e. a frequency differing by a small amount, namely 100 kc./s., from the maximum frequency of modulator and oscillator 1. Crystal 9*a* and the modulator 1 feed a mixer 10*a*, the output of which is coupled to band pass filter detector 11*a* centered on 100 kc./s. and having a band width of 10 kc./s. This filter detector is coupled through a low pass filter 12*a* and a rectifier 13*a* connected as shown to the integrator 8.

This feedback loop operates as follows:

Mixer 10*a* provides a signal, the frequency of which varies as a function of time from 0.1 mc./s. to 4.6 mc./s., according to a triangle waveform pattern. This frequency is equal to .1 mc./s. when the frequency of modulator 1 is maximum and to 4.6 mc./s. when this frequency is minimum, provided of course that the modulator rigorously follows the assigned law. When this frequency is comprised within .1±.01 mc./s., filter 11*a* passes a pulsed signal. If the frequency of modulator 1 reaches a maximum higher than 31.75 mc./s., the pulse derived from filter 12*a* will have a longer duration and will tend to divide, if the maximum frequency exceeds 31.75 mc./s. Conversely, for a maximum frequency lower than 31.75 mc./s., the duration of the pulse will be smaller. Filter 12*a* derives, from the pulse signal obtained, an integrated D.C. component, which varies slowly as a function of the maximum frequency reached.

Loop *b* is identical to loop *a*, except that detector 13*b* is connected in the opposite direction to detector 13*a* and that quartz 9*b* delivers the frequency 27.15 mc./s.

Crystals 13*a* and 13*b* enable the signal delivered by the multivibrator 7 to be clipped and to assign thereto extreme voltages, equal to those delivered by filters 12*a* and 12*b*.

It may be readily shown that both feedback loops act independently of one another.

It is to be understood that the values given are in no way limitative.

What is claimed is:

1. Frequency modulation arrangement for frequency modulating, according to a predetermined waveform, an electronically tunable tube including a first and a second control electrode, comprising in combination; a generator for generating a voltage varying periodically from a maximum to a minimum and vice-versa and attaining said maximum and minimum at predetermined and cyclically repeated times; a first modulator connected to said generator and first electrode for applying said voltage to said first electrode; a second modulator connected to said generator for generating a frequency modulated wave whose frequency varies in synchronism with said voltage; an output element in said tube, a mixer having a first input connected to said output element, a second input connected to said second modulator, and an output; a discriminator connected to said output for generating a control voltage; and means series connected between said first modulator and said second control electrode to apply a voltage to the latter, said means being further connected to said discriminator for receiving and being controlled by said control voltage.

2. Frequency modulation arrangement for frequency modulating, according to a predetermined waveform, a backward traveling wave oscillator tube including a cathode and a sole electrode, comprising in combination: a generator for generating a voltage varying periodically from a maximum to a minimum and vice-versa and attaining said maximum and minimum at predetermined and cyclyically repeated times; a first modulator connected to said generator and cathode for applying said voltage to said cathode; a second modulator connected to said generator for generating a frequency modulated wave, whose frequency varies in synchronism with said voltage; an output element in said tube; a mixer having a first input connected to said output element, a second input connected to said second modulator, and an output; a discriminator connected to said output for generating a control voltage; means series connected between said first modulator and said sole electrode for applying a voltage to the latter, said means being further connected to said discriminator for receiving said control voltage and being controlled thereby.

3. Frequency modulation arrangement for frequency modulating, according to a predetermined isosceles triangle waveform, a backward travelling wave oscillator tube including a cathode and a sole electrode, comprising in combination: integrating means for generating a voltage varying periodically according to said isoceles triangle waveform from a maximum to a minimum and vice-versa and attaining said maximum and minimum, at predetermined and cyclically repeated times; a first modulator connected to said means and cathode for applying said voltage to said cathode; a second modulator connected to said integrating means for generating a frequency modulated wave, whose frequency varies between a maximum and a minimum in synchronism with said voltage; an output element in said tube; a frequency multiplier connected to said second modulator for frequency multiplying said wave; a mixer having a first input connected to said output element, a second input connected to said frequency multiplier and an output for generating beats; a discriminator connected to said output for generating a control voltage responsive to the frequency variations of said beats; means series connected between said first modulator and said sole electrode for applying a voltage to the latter, said means being further connected to said discriminator for receiving said control voltage and being controlled thereby.

4. Frequency modulation arrangement for frequency modulating, according to a predetermined isoceles triangle waveform, a backward travelling wave oscillator tube including a cathode and a sole electrode, comprising in combination: integrating means for generating a voltage varying periodically according to said isosceles triangle waveform from a maximum to a minimum and vice-versa and attaining said maximum and minimum at predetermined and cyclically repeated times; a first modulator connected to said means and cathode for applying said voltage to said cathode; a second modulator connected to said integrating means for generating a frequency modulated wave, whose frequency between a maximum and a minimum varies in synchronism with said voltage; an output element in said tube; a frequency multipler connected to said second modulator for frequency multiplying said wave; a mixer having a first input connected to said output element, a second input connected to said frequency multiplier and an output for generating beats; a discriminator connected to said output for generating a control voltage responsive to the frequency variations of said beats; means series connected between said first modulator and said sole electrode for applying a voltage to the latter, said means being further connected to said discriminator for receiving said control voltage and being controlled thereby; a bistable multivibrator having an input for collecting synchronizing pulses, recurrent at said predetermined times, for producing a square wave voltage, means for feeding the latter said voltage to said integrating means.

5. Frequency modulation arrangement for frequency modulating, according to a predetermined isosceles triangle waveform, a backward travelling wave oscillator tube including a cathode and a sole electrode, comprising in combination: integrating means for generating a voltage varying periodically according to said isosceles triangle waveform, from a maximum to a minimum and vice-versa, and attaining said maximum and minimum at predetermined and cyclically repeated times; a first modulator connected to said means and cathode for applying said voltage to said cathode; a second modulator connected to said integrating means for generating a frequency modulated wave, whose frequency between a maximum and a minimum varies in synchronism with said voltage; an output element in said tube; a frequency multiplier connected to said second modulator for frequency multiplying said wave; a mixer including a first input connected to said output element, a second input connected to said frequency multiplier and an output for generating beats; a discriminator connected to said output for generating a control voltage responsive to the frequency variations of said beats; means series connected between said first modulator and said sole electrode for applying a voltage to the latter, said means being further connected to said discriminator for receiving said control voltage and being controlled thereby, a bistable multivibrator including an input for collecting synchronizing pulses, recurrent at said predetermined times, for producing a square wave voltage, means for feeding said square wave voltage to said integrating means; an output and an input in said second modulator; a first and a second feedback chain connected between said input and said output of said last named modulator, and in said first and in said second chain respectively a first and a second frequency stabilized oscillator, the frequencies of which are respectively substantially equal to the maximum and to the minimum frequency of said frequency modulated wave, and in each chain; a mixer having respective inputs connected to said fixed frequency oscillator, and to said modulator, and an output for delivering the beat frequency thereof; a filter for passing beats having a predetermined frequency, and delivering pulses having widths in accordance with the frequency of said beats, a low-pass filter connected to the first filter for providing a direct current voltage according to the width of said pulses, and a detector connected to said multivibrator for comparing said direct current voltage with the respective maximum and minimum levels of said square wave signal.

References Cited in the file of this patent

UNITED STATES PATENTS

| | | |
|---|---|---|
| 2,507,170 | Mesner | May 9, 1950 |
| 2,921,271 | Collins et al. | Jan. 13, 1960 |